United States Patent [19]

Takashina et al.

[11] Patent Number: 5,298,271

[45] Date of Patent: Mar. 29, 1994

[54] METHOD OF PREVENTING EDIBLE OILS AND FATS FROM DETERIORATING

[75] Inventors: Shoichi Takashina; Takashi Hazama; Akira Kurooka, all of Osaka; Norio Maruguchi, Sakai; Hiroshi Iwasa, Osaka; Masayoshi Saito, Sakai, all of Japan

[73] Assignee: Fuji Oil Co., Ltd., Osaka, Japan

[21] Appl. No.: 922,648

[22] Filed: Jul. 30, 1992

Related U.S. Application Data

[63] Continuation of Ser. No. 723,654, Jun. 26, 1991, abandoned, which is a continuation of Ser. No. 509,506, Apr. 16, 1990, abandoned.

[30] Foreign Application Priority Data

Apr. 14, 1989 [JP] Japan ..................... 1-95890

[51] Int. Cl.⁵ .............................. A23D 9/00
[52] U.S. Cl. .................... 426/312; 426/319; 426/417
[58] Field of Search ............... 426/417, 418, 312, 319

[56] References Cited

U.S. PATENT DOCUMENTS

| | | | |
|---|---|---|---|
| 2,463,363 | 3/1949 | Dunkley | 426/317 |
| 2,518,100 | 8/1950 | Tomkins | 426/404 |
| 2,789,059 | 4/1957 | Lindewald | 426/418 |
| 2,978,336 | 4/1961 | Morrison | 426/418 |
| 3,365,307 | 1/1968 | Dixon | 426/418 |
| 3,900,571 | 8/1975 | Johnson | 426/312 |
| 4,935,255 | 6/1990 | Anderson et al. | 426/317 |

FOREIGN PATENT DOCUMENTS 52-28505 3/1977 Japan .

OTHER PUBLICATIONS

Studies on Rancidity, Emery et al, The Journal of Industrial & Engineering Chemistry, Oct. 1922, pp. 937–940, vol. 14, No. 10.

Primary Examiner—Carolyn Paden
Attorney, Agent, or Firm—Wenderoth, Lind & Ponack

[57] ABSTRACT

A method for preventing refined edible oils and fats from deteriorating during transportation and/or storage thereof over a prolonged period of time, wherein the refined edible oils and fats are stored and/or transported at all times under an atmosphere rich in nitrogen gas. This nitrogen-enriched atmosphere contains nitrogen in a concentration not lower than 99.5%.

3 Claims, 1 Drawing Sheet

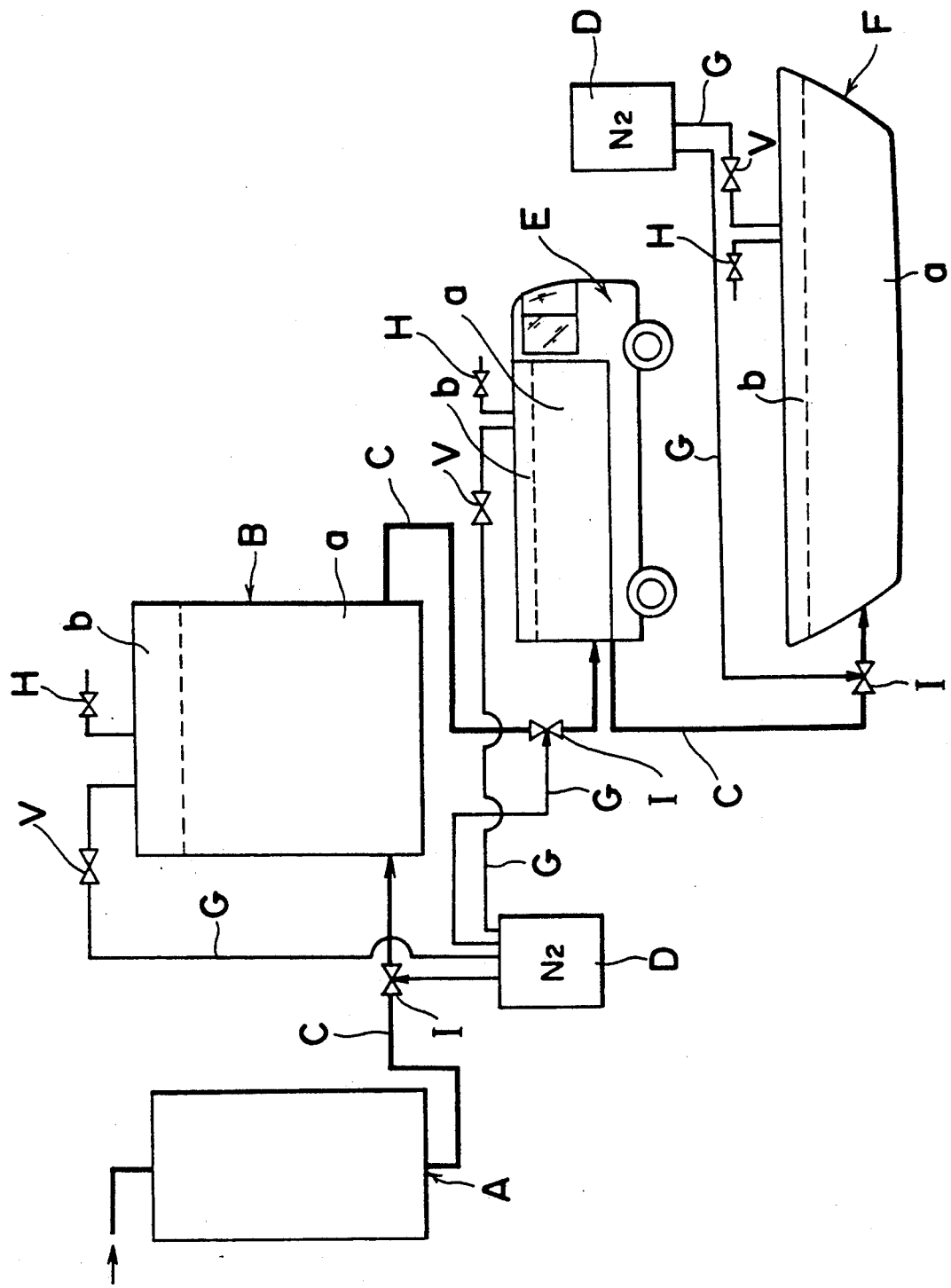

METHOD OF PREVENTING EDIBLE OILS AND FATS FROM DETERIORATING

This application is a continuation of now abandoned application Ser. No. 07/723,654 filed on Jun. 26, 1991 which is a continuation of now abandoned application Ser. No. 07/509,506 filed Apr. 16, 1990.

BACKGROUND OF THE INVENTION

1. Field of the Invention

The present invention relates to a method for avoiding a deterioration of refined edible oils and fats during transportation and/or storage thereof over a prolonged period of time.

2. Description of the Prior Art

It is generally well known that, when edible oils and fats are exposed to oxygen in the air during the storage thereof over a substantially prolonged period of time, deterioration of the quality of the edible oils and fats takes place. It is a recent trend that the refined edible oils and fats are not only circulated for domestic consumption, but also imported from or exported to foreign countries. Japan has long imported materials for the edible oils and fats for pression, extraction and refinement to produce refined edible oils and fats that can be used for domestic consumption. In recent years, however, importation of the refined edible oils and fats readily available for domestic consumption is progressively, but steadily gaining a major role because some foreign countries of origin of the material for the edible oils and fats have pursued a national policy for the material to be refined there prior to exportation thereof, or because of an attempt to minimize the transportation cost.

In any event, when the oils and fats are to be exported or imported, much tune is spent during transportation thereof from the port of dispatch to the port of destination, for example, in storing them at a wharf prior to shipment, loading them into a tanker, voyage, unloading them from the tanker at a wharf at the port of destination and storing them subsequent to the discharge from the tanker. Although the length of time spent during the transportation varies with the amount of the crude oils and fats handled, it often amounts to weeks and, in the worst case it may take about half a year subsequent to the refinement and prior to the actual use.

During the period subsequent to the refinement and prior to the actual use, the refined oils and fats may be oxidized in contact with oxygen in the air to produce peroxides or similar substances and the peroxide number of the refined oils and fats increases consequently. At the same time, the amount of free fatty acid in the refined oils and fats tends to increase, resulting in both coloring of the oils and fats and reduction in taste thereof to such an extent as to bring about a reduction in value thereof. For example, in the case of palm oil which is relatively stable because of a high content of saturated fatty acid, the storage thereof in a tank at 60° C. for five days has been observed to result in an increase of the peroxide number over 1 meq/kg, accompanied by regaining the inherent color and, also, a reduction in taste. Once this happens, the palm oil is required to be refined prior to the actual use at the cost of facilities and expenditures similar to those utilized at the time of the initial refinement. In view of the foregoing, numerous attempts have long been made to avoid any possible deterioration in quality of the refined edible oils and fats during the storage and transportation.

By way of example, Japanese Laid-open Patent Publication No. -02-28505, published Mar. 3, 1977, discloses a method wherein, in order to stabilize the quality of edible oil such as, for example, soybean oil or rapeseed oil during the storage thereof, the edible oil contains a gaseous nitrogen dissolved therein in a saturated state prior to being filled in a sealed vessel such as a can. This known method does indeed contribute to minimization of the spoilage of the edible oil during the storage and transportation thereof, as the edible oil is placed in an atmosphere rich in nitrogen gas.

However, it has been found that the known method discussed above is still far from a complete avoidance of spoilage of the edible oils and fats despite the fact that the edible oils and fats are stored and transported under the atmosphere rich in nitrogen gas. By way of example, it has been observed that the storage of the edible oil under the atmosphere rich in nitrogen gas for 15 days resulted in an increase of the peroxide number over about 0.5 meq/kg, accompanied by a considerable reduction in taste and, fiance, in quality. While the above discussed method has exhibited an effective improvement over the conventional method in which the edible oils and fats are stored under the ambient atmosphere, the method is ineffective and requires an aftermath refinement immediately before the actual use particularly where storage and transportation takes a relatively long time prior to the actual use. The term "aftermath" used in conjunction with the refinement of the edible oils and fats means a refinement to be done the second time, before the actual use and after the storage for a substantial period of time, due to deterioration in quality.

SUMMARY OF THE INVENTION

Accordingly, the present invention has been devised with a view to providing a method for stabilizing the quality of the edible oils and fats, which does not require any aftermath refinement even though the edible oils and fats are stored for a prolonged period of time, for example, half a month to half a year.

For accomplishing the above described object, the inventors of the present invention have examined the conventional methods of storing and transporting the edible oils and fats under the nitrogen-enriched atmosphere. It has been found that most of the conventional methods of this kind require the use of an atmosphere containing nitrogen in a concentration not higher than 97% or, if nitrogen gas is highly substituted, in a concentration of about 99%.

The edible oils and fats once refined are transshipped from one storage tank to another, for example, from a storage tank at a refinery to a tank lorry, then from the tank lorry to a storage tank at the port of dispatch, from the storage tank at the port of dispatch to a tanker, from the tanker to a storage tank at the port of destination, from the storage tank at the port of destination to a tank lorry, and finally from the tank lorry to a storage tank at a manufacturer's plant. Each of these tanks contains air at the time a quantity of the edible oils and fats are loaded thereinto, and the air in each tank is purged therefrom as the edible oils and fats are poured into the respective tank, thereby to minimize the space within the respective tank. In general, the space is required by law to be of a volume not lower than 10% relative to the total volume of each tank for the purpose of controlling the pressure inside the tank. After the respective tank has been filled with the edible oils and fats, a nitrogen gas is injected into the tank to occupy the space in an increased concentration enough to substitute for air. This substitution of the nitrogen gas for air requires the use of a relatively large quantity of nitrogen and, however, the supply of the nitrogen gas into the space in a quantity about four times the volume of the space within the tank results in no more than 98% concentration within the space. On the other hand, since the edible oils and fats filled in each tank contact air in the space within the tank, air in the space tends to be dissolved into the edible oils and fats and, therefore, it often occurs that, even through air in the space is substituted by a high concentration of the nitrogen gas, oxygen dissolved into the refined edible oils and fats tends to react with the edible oils and fats to such an extent as to eventually result in deterioration of the quality of the edible oils and fats.

In order to avoid any possible adverse influence which oxygen present in each tank may bring about on the edible oils and fats filled in the tank, an attempt has been made to fill the tank with the refined edible oils and fats after air completely filling up the empty tank has been purged by and, hence, replaced with a nitrogen gas. According to this attempt, however, a larger quantity of nitrogen gas than that required to substitute for air in the 10% space within each tank is required, resulting in an increase in cost. Accordingly, in most cases, this attempt is not employed in practice.

Under these circumstances, the inventors of the present invention have examined the deterioration of the quality of the edible oils and fats to successfully devised the present invention. The present invention thus provide a method of avoiding a deterioration of the refined edible oils and fats during transportation and/or storage thereof over a prolonged period of time, which is featured in that the refined edible oils and fats are stored and/or transported Under an atmosphere containing a nitrogen gas in a concentration not lower than 99.5% at all times.

BRIEF DESCRIPTION OF THE DRAWINGS

This and other objects and features of the present invention will become clear from the following description of a preferred embodiment thereof made with reference to the sole drawing which illustrates a schematic piping diagram showing how the refined edible oils and fats are stored and transported.

DETAILED DESCRIPTION OF THE EMBODIMENT

As hereinabove discussed, the present invention is featured in that the refined edible oils and fats are stored and/or transported under an atmosphere containing a nitrogen gas in a concentration not lower than 99.5% at all times. In order to create the nitrogen-enriched atmosphere in which the refined edible oils and fats are placed during the storage and/or transportation, it is preferred to cause the nitrogen gas to be included in the refined edible oils and fats to be filled in a tank or any other vessel, in a quantity enough to render the nitrogen gas supersaturated in the refined edible oils and fats while the supply of the nitrogen gas is continued even thereafter to achieve the 99.5% or higher concentration. When the nitrogen gas is maintained in a supersaturated state in the refined edible oils and fats in accordance with the present invention, a dissolution of oxygen into the refined edible oils and fats can be advantageously avoided even though contact of the refined edible oils and fats with air takes place. Containment of the nitrogen gas in the refined edible oils and fats in the supersaturated state can be accomplished by an introduction of gaseous nitrogen into a piping system leading to the tank or any other vessel for the storage and/or transportation of the refined edible oils and fats. In such case, the quantity of the nitrogen gas introduced, although variable with the concentration of oxygen in the tank or vessel, is preferably selected to be not lower than 20 vol. % relative to the quantity of the refined edible oils and fats being filled in the tank, or not lower than 50 vol. % where the tank contains ambient atmosphere.

Where the refined edible oils and fats are to be filled in the tank containing ambient atmosphere, it is important for the refined edible oils and fats to be introduced into the tank from the bottom thereof so that elevation of the top surface of the body of refined edible oils and fats within the tank can result in a progressive reduction in volume of the space above such top surface while air in the space is concurrently replaced with the nitrogen gas. By so doing, the contact of the refined edible oils and fats with the atmosphere can be advantageously minimized.

When the refined edible oils and fats within one tank, say, a first tank, are transferred into another tank, say, a second tank, the first tank is emptied completely or contains the space of a volume increased consequent upon descent of the top surface of the body of the refined edible oils and fats. Normally, as the refined edible oils and fats are discharged from the first tank for loading into the second tank, the internal pressure of the first tank is reduced thereby to create a drag force by which air outside the tank can be drawn into the tank. However, in the practice of the present invention, reduction in internal pressure of the first tank is compensated for by the replenishment of the nitrogen gas so that the first tank contains the nitrogen gas in a concentration not lower than 99. 5% at all times. This is on, of the important requirements of the present invention for the first tank to be filled with the nitrogen-enriched atmosphere.

The replenishment of the nitrogen gas to compensate for the reduction in internal pressure of the tank and also to retain the highly nitrogen-enriched atmosphere within such tank can be accomplished by recirculating the nitrogen gas discharged from the space within the tank. The utilization of the discharged nitrogen gas for recirculation into the tank is particularly advantageous in that the total amount of nitrogen gas used in the practice of the method of the present invention can be minimized. Whenever the nitrogen gas once discharged from the tank is used for the recirculation into the tank to compensate for the reduction in internal pressure and also to keep the highly nitrogen-enriched atmosphere within the tank as discussed above, the discharged nitrogen gas should preferably contain nitrogen in a concentration riot lower than 99.5%.

When it comes to an ocean-going tanker for the marine transportation of the refined edible oils and fats, the tanker may occasionally carry different cargoes on its voyage from one port to another and on its return voyage. Therefore, once air is drawn into cargo holds in the tanker during the cleansing in readiness for the loading of the refined edible oils and fats, the nitrogen gas discharged therefrom may contain nitrogen in a concentration lower than 99.5%. In such case, the nitrogen gas containing nitrogen in a concentration lower than 99.5% is undesirable for re-use by recirculation.

Even though the concentration of nitrogen in the nitrogen gas within the tank or any other vessel is maintained at a value not lower than 99.5% in the manner as hereinbefore described, a gaseous body in the space within the tank and above the top surface of the refined edible oils and fats may undergo cycles of expansion and compression, accompanied by cyclic increase and decrease of the pressure inside such space with the consequence that the tank undergoes a 'breathing' action with air being drawn into and out of the tank. While increase in pressure resulting in an increase of temperature can be relieved by discharging part of the nitrogen gas within the tank to the outside through a safety valve which is required by law to be installed on top of the tank, reduction in pressure resulting from a lowering of temperature allows air to be drawn into the tank through the breathing valve, lowering the concentration of nitrogen within the tank down to a value lower than 99.5% which is therefore undesirable because it would eventually lead to a spoilage of the refined edible oils and fats.

In order to avoid an introduction of air into the tank as a result of the breathing action of the tank incident to change in temperature, it is preferred that a mechanism be employed in the practice of the present invention for supplementing a quantity of nitrogen gas which is enough to compensate for reduction in pressure within the tank. This mechanism may include the detection of the pressure inside the tank and the subsequent blowing of the nitrogen gas into the tank automatically when the pressure detected inside the tank is lowered. Alternatively, the mechanism may include a constant blowing of a small quantity of nitrogen gas into the tank regardless of any change in temperature, thereby to create a positive pressure within the tank at all times to avoid any possible ingress of air from outside.

The blowing of the nitrogen gas into the tank may be carried out through the bottom of the tank. The supply of the nitrogen gas into the tank from the bottom thereof is effective to render the gaseous body within the space to be difficult to dissolve into the refined edible oils and fats while accomplishing an increase in concentration of the nitrogen within the space. The quantity of the nitrogen gas blown into the tank is preferably so selected as to be of a value enough to compensate for reduction in pressure within the space resulting from the lowering of temperature and may then be determined in consideration of the speed of change in temperature and/or the volume of the space within the tank.

Thus, according to the present invention, when the concentration of nitrogen in the entire system of storage and transportation of the refined edible oils and fats is controlled to and maintained at a value not lower than 99.5%, any possible spoilage of the refined edible oils and fats can be effectively avoided to such an extent that the refined edible oils and fats can be stored for a prolonged period of time, for example, half a year with no aftermath refinement required.

Hereinafter, the present invention will be demonstrated by way of examples which are not intended to limit the scope of the present invention, but are employed only for the purpose of illustration.

Referring to the sole drawing, reference character C represents various oil supply piping through which oils and fats flow; reference character I represents an injector disposed on each of the pipings C for injecting therethrough a nitrogen gas into the respective piping C for mixing with the oils and fats; reference character H represents safety valves disposed atop respective tanks; reference character D represents sources of nitrogen gas; reference character G represents gas supply pipings through which the nitrogen gas is supplied; and reference character V represents a shut-off valve disposed on each of the gas supply pipings G.

EXAMPLE 1

Palm oil a refined and passed through a deodorizing tower A at a refinery in Malaysia was filled, through a supply piping C having an injector I, in a storage tank B, installed at the refinery, in a quantity for the palm oil a to occupy 90% of the total volume of the storage tank B. At this time, 30 vol. % of nitrogen gas of 99.99% in purity relative to the volume of the refined palm oil was introduced under pressure from a source D of nitrogen gas into a piping G through the injector I. The concentration of nitrogen within the space b above the top surface of the refined palm oil a so filled into the storage tank B was 91.3%. The concentration of nitrogen within the tank B at the refinery was 99.2% when measured after a period of 5 days storage during which the nitrogen gas containing 91.3% concentration of nitrogen had been supplied under pressure from the bottom into the tank B at the refinery from the nitrogen gas source D, the rate of supply per hour of the nitrogen gas during this storage period having corresponded to about 2% of the space b within the tank B.

The palm oil a having been stored in the tank B at the refinery was then transported to a storage tank (not shown) at the port of dispatch by means of a tank lorry E for the storage there for 3 days. After the storage for the 3 days in the storage tank at the port of dispatch, the palm oil a was loaded into a tanker F and was then transported to a port of destination in Japan where it was unloaded from the tanker F into a storage tank. The transportation on the sea took 15 days. The palm oil in the storage tank at the port of destination was subsequently transported by a tank lorry to a buyer. Although during these transportation periods each of the tanks had contained air, the nitrogen gas was, each time the palm oil was transferred from one tank to another, supplied into each tank from the respective nitrogen gas source D in a quantity sufficient to compensate for reduction in the surface level of the palm oil within the associated tank to keep the atmosphere of nitrogen gas within such associated tank B, E or F while, at the time of the loading of the palm oil into the next succeeding tank, the nitrogen gas is supplied under pressure into a piping C leading to such next succeeding tank. During the storage and transportation, the nitrogen gas was blown from the bottom into the associated tank at all times.

While the foregoing is a first shipment of the palm oil from Malaysia to Japan, a second shipment of palm oil was carried out in a manner similar to that described in connection with the first shipment except that the concentration of nitrogen within each of the tanks used during this shipment was kept at 99.8%.

The quality of the palm oil in each of the tanks used during the transportation from the tank at the refinery to the tank (stored for 10 days) at the port of destination and measurements of the nitrogen concentration in the atmosphere within each of the tanks used are tabulated in Tables 1a and 1b.

TABLE 1a (First Shipment)

|  | Storage Days | N₂ Concentration (%) | POV (meq/kg) | FFA (%) |
|---|---|---|---|---|
| Immediately after Refinement | — | — | 0 | 0.02 |
| When unloading from Tank at Refinery | 5 | 99.2 | 0.04 | 0.04 |
| When unloading from Tank at Port of Dispatch | 3 | 94.5 | 0.11 | 0.07 |
| In Tanker | 15 | 99.8 | 0.48 | 0.13 |
| When unloading from Tank at Port of Destination | 10 | 99.4 | 0.58 | 0.18 |

TABLE 1b (Second Shipment)

|  | Storage Days | N₂ Concentration (%) | POV (meq/kg) | FFA (%) |
|---|---|---|---|---|
| Immediately after Refinement | — | — | 0 | 0.02 |
| When unloading from Tank at Refinery | 5 | 99.8 | 0 | 0.02 |
| When unloading from Tank at Port of Dispatch | 4 | 94.8 | 0 | 0.02 |
| In Tanker | 16 | 99.9 | 0 | 0.02 |
| When unloading from Tank at Port of Destination | 9 | 99.8 | 0 | 0.02 |

In each of Tables 1a and 1b, the $N_2$ concentration represents that within the space above the top surface of the oil within each of the tanks, POV represents the peroxide number of the refined palm oil, and FFA represents the free fatty acid contained in the refined palm oil.

The palm oil in the first shipment has exhibited a reduction in quality, particularly that in taste, to such an extent as to require the aftermath refinement. This is partly because the palm oil contacted air within each of the tanks used and partly because the concentration of nitrogen in each of the tanks used could not be adjusted sufficiently to a required value. In contrast thereto, the palm oil in the second shipment has exhibited no substantial reduction in quality.

EXAMPLE 2

A tanker often carries a different cargo during its return voyage and, in such case, maintenance of the nitrogen-enriched atmosphere is difficult. Except for the occurrence of the situation in which the nitrogen-enriched atmosphere in the tanker was destroyed with air consequently introduced from the outside and, also of the situation in which the quantity of nitrogen gas introduced into the piping at the time of loading of the refined palm oil into the tanker was selected to be 60 vol. % relative to the refined palm oil, the storage and transportation of the refined palm oil was carried out in a manner similar to the second shipment in Example 1.

The quality of the palm oil in each of the tanks used during the transportation and measurements of the nitrogen concentration in the atmosphere within each of the tanks used are tabulated in Table 2.

TABLE 2

|  | Storage Days | N₂ Concentration (%) | POV (meq/kg) | FFA (%) |
|---|---|---|---|---|
| Immediately after Refinement | — | — | 0 | 0.02 |
| When unloading from Tank at Refinery | 5 | 99.9 | 0 | 0.02 |
| When unloading from Tank at Port of Dispatch | 4 | 99.9 | 0 | 0.02 |
| In Tanker | 17 | 99.7 | 0.08 | 0.02 |
| When unloading from Tank at Port of Destination | 8 | 99.9 | 0.10 | 0.02 |

Although the quality of the palm oil showed a tendency of being lowered during the loading thereof into the tanker as a result of the contact with the ambient atmosphere, no reduction in taste was found.

EXAMPLE 3

During the storage and transportation of refined palm oil in a manner similar to the second shipment under Example 1, the nitrogen gas discharged from each of the tanks at the time of filling thereof into the associated tank was recovered for replenishing into the space within the tank into which it was filled.

The quality of the palm oil in each of the tanks used during the transportation and measurements of the nitrogen concentration in the atmosphere within each of the tanks used are tabulated in Table 3.

TABLE 3

|  | Storage Days | N₂ Concentration (%) | POV (meq/kg) | FFA (%) |
|---|---|---|---|---|
| Immediately after Refinement | — | — | 0 | 0.02 |
| When unloading from Tank at Refinery | 5 | 99.9 | 0 | 0.02 |
| When unloading from Tank at Port of Dispatch | 3 | 99.9 | 0 | 0.02 |
| In Tanker | 18 | 99.8 | 0.08 | 0.02 |
| When unloading from Tank at Port of Destination | 9 | 99.9 | 0.10 | 0.02 |

Table 3 indicates that even the use of the recovered nitrogen gas resulted in a quality of the palm oil which is similar to the second shipment under Example 1.

EXAMPLE 4

Soybean oil extracted from soybeans and subsequently refined was filled in a tank at a refinery located at a port of dispatch and subsequently loaded directly from the tank into a small-sized tanker for transportation to a domestic remote tank base. During this transportation, the nitrogen-enriched atmosphere was controlled and maintained in a manner similar to that in Example 3.

The quality of the soybean oil in each of the tanks used during the transportation and measurements of the nitrogen concentration in the atmosphere within each of the tanks used are tabulated in Table 3.

TABLE 4

|  | Storage Days | N₂ Concentration (%) | POV (meq/kg) | FFA (%) |
|---|---|---|---|---|
| Immediately after Refinement | — | — | 0 | 0.02 |
| When unloading from Tank at Refinery | 10 | 99.9 | 0 | 0.02 |
| In Tanker | 3 | 99.9 | 0 | 0.02 |
| When unloading from Tank at the Base | 15 | 99.9 | 0 | 0.02 |

Although the present invention has been described in connection with the preferred embodiment thereof and the illustrative examples, it is to be noted that various changes and modifications are apparent to those skilled in the art. Such changes and modifications are to be understood as included within the scope of the present invention as defined by the appended claims, unless they depart therefrom.

What is claimed is:

1. A method of preventing refined edible oils and fats from deteriorating during storage and transportation thereof, comprising the steps of:
    introducing nitrogen gas into said refined edible oils and fats in an amount of not lower than 20 volume % relative to the quantity of said oils and fats to supersaturate said oils and fats with nitrogen gas;
    introducing nitrogen gas into piping and, also, into a tank through the bottom of said tank, to fill said piping and tank with nitrogen gas upon removing away air in said piping and tank;
    charging said oils and fats supersaturated with nitrogen gas through said piping into said tank having been filled with the nitrogen gas;
    adjusting the pressure inside said tank in dependence on a change in pressure inside said tank resulting from a change in temperature during the storage or transportation of the refined edible oils and fats in said tank, said adjustment being carried out by blowing nitrogen gas into said tank to maintain a positive pressure inside said tank and maintain the atmosphere of nitrogen gas of not lower than 99.5%; and
    discharging said oils and fats from said tank while introducing nitrogen gas into said oils and fats in an amount of not lower than 20 volume % relative to the quantity of said oils and fats to supersaturate said oils and fats with nitrogen gas, and concurrently introducing nitrogen gas into said tank without any air entering into said tank;
    wherein said oils and fats are placed under an atmosphere of nitrogen gas to supersaturate said oils and fats with nitrogen gas at all times during the storage and transportation, said atmosphere of nitrogen gas always having a concentration of not lower than 99.5% of nitrogen gas.

2. The method as claimed in claim 1, wherein the refined edible oils and fats are transferred from a first tank for storage or transportation to a second tank for storage or transportation, and nitrogen gas discharged from the second tank when the refined edible oils and fats are transferred into the second tank is introduced into a space within the first tank from which the refined edible oils and fats are transferred.

3. A method of preventing refined edible oils and fats from deteriorating during storage and transportation thereof, comprising the steps of:
    introducing nitrogen gas into said refined edible oils and fats in an amount of not lower than 20 volume % relative to the quantity of said oils and fats to supersaturate said oils and fats with nitrogen gas;
    introducing nitrogen gas into piping and, also, into a first tank and a second tank through the bottom of said tanks, to fill said piping and first and second tanks with nitrogen gas upon removing away air from said piping and first and second tanks;
    charging said oils and fats supersaturated with nitrogen gas through said piping into said first tank having been filled with the nitrogen gas to store said oils and fats in said first tank;
    transferring said oils and fats from said first tank through said piping to said second tank while introducing nitrogen gas into said oils and fats in an amount of not lower than 20 volume % relative to the quantity of said oils and fats to supersaturate said oils and fats with nitrogen gas during the transferring, and concurrently introducing nitrogen gas into said first tank without any air entering into said first tank; and
    adjusting the pressure inside said first and second tanks in dependence on a change in pressure inside said first and second tanks resulting from a change in temperature during the storage or transportation of the refined edible oils and fats in said first and second tanks, said adjustment being carried out by blowing nitrogen gas into said first and second tanks to maintain a positive pressure inside said first and second tanks and maintain the atmosphere of nitrogen gas of not lower than 99.5%;
    wherein said oils and fats are placed under an atmosphere of nitrogen gas to supersaturate said oils and fats with nitrogen gas at all times during the storage and transportation, said atmosphere of nitrogen gas always having a concentration of not lower than 99.5% of nitrogen gas.

* * * * *